United States Patent
McGregor et al.

(10) Patent No.: US 10,564,291 B1
(45) Date of Patent: Feb. 18, 2020

(54) GLOBAL POSITIONING SYSTEM (GPS) RECEIVERS FOR MUNITIONS

(71) Applicant: Rockwell Collins, Inc., Cedar Rapids, IA (US)

(72) Inventors: Marty R. McGregor, Marion, IA (US); Jacob C. Overath, Cedar Rapids, IA (US); Scott R. Ernst, Cedar Rapids, IA (US); Mark M. Mulbrook, Marion, IA (US); Russell C. Tawney, Cedar Rapids, IA (US); Walter Trach, Cedar Rapids, IA (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 303 days.

(21) Appl. No.: 15/448,265

(22) Filed: Mar. 2, 2017

(51) Int. Cl.
| | |
|---|---|
| *G01S 19/35* | (2010.01) |
| *G01S 19/18* | (2010.01) |
| *G01S 19/37* | (2010.01) |
| *G01S 19/36* | (2010.01) |
| G01S 19/32 | (2010.01) |
| G01S 19/21 | (2010.01) |

(52) U.S. Cl.
CPC .............. *G01S 19/35* (2013.01); *G01S 19/18* (2013.01); *G01S 19/36* (2013.01); *G01S 19/37* (2013.01); *G01S 19/215* (2013.01); *G01S 19/32* (2013.01)

(58) Field of Classification Search
CPC ........ G01S 19/18; G01S 19/215; G01S 19/32; G01S 19/35; G01S 19/36; G01S 19/37
USPC ............ 342/357.56, 357.72, 357.59, 357.75, 342/357.76, 357.77
See application file for complete search history.

(56) References Cited

U.S. PATENT DOCUMENTS

| | | | | |
|---|---|---|---|---|
| 5,379,968 A | * | 1/1995 | Grosso .................. | F42B 10/661 244/3.21 |
| 5,425,514 A | * | 6/1995 | Grosso .................... | F41G 3/145 244/3.22 |
| 5,504,684 A | * | 4/1996 | Lau ......................... | G01S 19/37 340/988 |
| 6,892,646 B1 | * | 5/2005 | Zimmerman ............. | F41G 7/22 102/293 |
| 7,630,430 B2 | * | 12/2009 | Bochkovskiy .......... | G01S 19/30 375/150 |
| 7,999,212 B1 | * | 8/2011 | Thiesen .................. | F42B 10/64 244/3.1 |

(Continued)

OTHER PUBLICATIONS

NavFire—I GPS Receiver, Rockwell Collins, 2 pages.

*Primary Examiner* — Chuong P Nguyen
(74) *Attorney, Agent, or Firm* — Donna P. Suchy; Daniel M. Barbieri

(57) ABSTRACT

A GPS receiver device can include at least one radio frequency (RF) chip implementing at least three RF modules configured to process RF signals received over at least three RF channels. Each RF module can be associated with a respective RF channel. Each RF module can include (1) a frequency demultiplexer and (2) at least two parallel circuits coupled to the frequency demultiplexer. Each of the parallel circuits can include (i) a RF amplifier connected to a respective output port of the frequency demultiplexer and (ii) an analog bandpass filter connected in series to the RF amplifier. The GPS receiver device can include a circuit board on which the at least one RF chip is mounted. The circuit board can have a breadth (e.g., length, width, or diameter) less than or equal to 1.65 inch.

20 Claims, 6 Drawing Sheets

(56) References Cited

U.S. PATENT DOCUMENTS

| | | | | |
|---|---|---|---|---|
| 8,640,619 B1 * | 2/2014 | Dimke | ............ | F42B 12/745 |
| | | | | 102/200 |
| 8,649,754 B2 * | 2/2014 | Burgener | ............ | H01Q 23/00 |
| | | | | 455/333 |

* cited by examiner

GLOBAL POSITIONING SYSTEM (GPS) RECEIVERS FOR MUNITIONS

BACKGROUND

Global navigational satellite systems (GNSS) include the global positioning system (GPS) and the Russian global orbiting navigational satellite system (GLONASS). GNSS-based navigational systems can allow for integration of positioning and navigational capabilities in a variety of civilian and military applications. For instance, in the GPS navigational system, GPS receivers can receive satellite positioning signals from a set of up to 32 satellites deployed in 12-hour orbits around the earth and dispersed in six orbital planes at an altitude of 10,900 nautical miles. GPS satellites can continuously transmit spread spectrum L-band signals, such as a L1 signal having a center frequency of 1575.42 MHz, a L2 signal having a center frequency of 1227.6 MHz, and a L5 signal having a center frequency of 1176.45 MHz. While in civilian applications GPS receivers usually make use of L1 signals, in military applications the GPS receivers can use L1 signals, L2 signals, and/or L5 signals.

A GPS receiver can decode information embedded in received GPS signals and use the decoded information to determine its location. In military applications, GPS signals (or more generally GNSS signals) can undergo jamming. For instance, in a battle field or a war zone, one entity can transmit jamming signals at the L1 center frequency, L2 center frequency, and/or L5 center frequency. Such jamming can prevent GPS receivers from receiving GPS signals transmitted by satellites. The jamming may substantially degrade the signal-to-noise ratio (SNR) of received GPS signals, such that any decoding of information embedded in received signals becomes unreliable.

In order to overcome the effect of jamming, GPS receivers used for military applications may employ anti-jamming techniques. However, as jamming techniques become more sophisticated, implementing anti jamming techniques in GPS receivers can lead to increased hardware and/or software complexity of such GPS receivers. Therefore, new ways to implement anti jamming while reducing complexity and/or GPS receiver dimensions would be beneficial.

SUMMARY

In one aspect, the inventive concepts disclosed herein are directed to a global positioning system (GPS) receiver device. The GPS receiver device can include at least one radio frequency (RF) chip including at least three RF modules configured to process RF signals received over at least three RF channels. Each RF module can be associated with a respective RF channel. Each RF module can include (1) a frequency demultiplexer and (2) at least two parallel circuits coupled to the frequency demultiplexer. Each of the parallel circuits can include (i) a RF amplifier connected to a respective output port of the frequency demultiplexer and (ii) an analog bandpass filter connected in series to the RF amplifier. The GPS receiver device can include a circuit board on which the at least one RF chip is mounted. The circuit board can have a breadth (e.g., length, width, or diameter) less than or equal to 1.65 inch.

The GPS receiver device can have a height less than or equal to 0.95 inch. The GPS receiver device can have a circular shape and a diameter less than or equal to 1.65 inch. The GPS receiver device can include a casing enclosing the circuit board. The GPS receiver device can include one or more analog-to-digital converters (ADCs) and at least three RF down-conversion devices. Each down-conversion device can frequency-shift output signals provided by a respective RF chip, and can provide the frequency-shifted signals as input to the one or more ADCs. The GPS receiver device of may include a processor for performing anti jamming processing on digital signals output by the one or more ADCs.

The RF signals received over each RF channel may include at least two signal components associated with at least two frequency bands. The frequency demultiplexer may separate the at least two signal components and can provide each signal component for processing on a respective circuit of the at least two parallel circuits. The at least two frequency bands can include at least two of a L1 frequency band, a L2 frequency band, and a L5 frequency band. The analog bandpass filters associated with the parallel circuits may include surface acoustic wave (SAW) filters. The analog bandpass filters associated with the parallel circuits may include bulk acoustic wave (BAW) filters. Each RF module in the GPS receiver device can have an out-of-band attenuation greater than or equal to 60 decibels relative to the carrier (dBc). The GPS receiver device can support power equal to 20 decibel-milliwatts (dBm).

In a further aspect, the inventive concepts disclosed herein are directed to a method of manufacturing or producing a global positioning system (GPS) receiver device. The method can include manufacturing or producing at least one radio frequency (RF) chip that includes at least three RF modules configured to process RF signals received over at least three RF channels. Each RF module can be associated with a RF channel. Each RF module can include (1) a frequency demultiplexer and (2) at least two parallel circuits coupled to the frequency demultiplexer. Each of the parallel circuits can include (i) an amplifier connected to a respective output of the frequency demultiplexer and (ii) an analog bandpass filter connected in series to the amplifier. The method can include manufacturing or producing a circuit board having a breadth less than or equal to 1.65 inch, and assembling the at least one RF chip on the circuit board.

The method can further include mounting one or more analog-to-digital converters (ADCs) to the circuit board, and mounting at least three RF down conversion devices to the circuit board. Each RF down conversion device can be arranged between a respective RF chip and the one or more ADCs. The RF signals received over each RF channel can include at least two signal components associated with at least two frequency bands. The frequency demultiplexer can be configured to separate the at least two signal components and can provide each signal component for processing on a respective circuit of the at least two parallel circuits.

The GPS receiver device can have a height less than or equal to 0.95 inch. The GPS receiver device can have a circular shape or structure, and a diameter less than or equal to 1.65 inch. The analog bandpass filters associated with the parallel circuits may include surface acoustic wave (SAW) filters. The analog bandpass filters associated with the parallel circuits may include bulk acoustic wave (BAW) filters.

In a further aspect, the inventive concepts disclosed herein are directed to a projectile device with location tracking. The projectile device can include at least one radio frequency (RF) chip that includes at least three RF modules configured to process RF signals received over at least three RF channels. Each RF module can be associated with a RF channel. Each RF module can include (1) a frequency demultiplexer and (2) at least two parallel circuits coupled to the frequency demultiplexer. Each of the parallel circuits can include (i) an amplifier connected to a respective output of the frequency demultiplexer and (ii) an analog bandpass filter connected in series to the amplifier. The projectile device can include a circuit board on which the at least one RF chip can be mounted. The circuit board can have a breadth less than or equal to 1.65 inch.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

Figure 1:
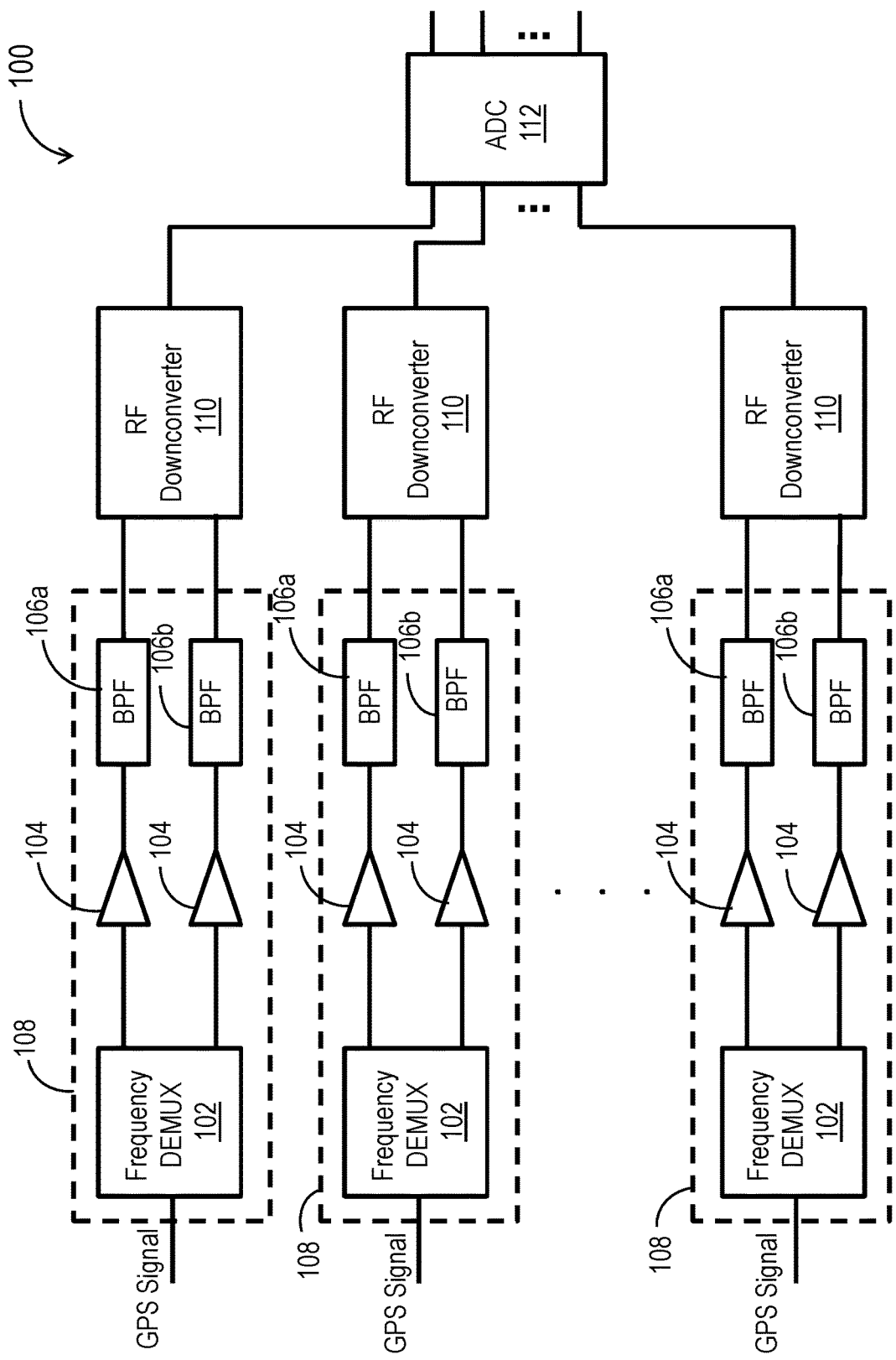
FIG. 1 shows a block diagram illustrating an example embodiment of a global positioning system (GPS) receiver circuit 100 that is capable of receiving GPS signals over multiple radio frequency (RF) channels, according to inventive concepts of this disclosure.

The details of various embodiments of the methods and systems are set forth in the accompanying drawings and the description below.

DETAILED DESCRIPTION

Before describing in detail embodiments of the inventive concepts disclosed herein, it should be observed that the inventive concepts disclosed herein include, but are not limited to a novel structural combination of components and circuits, and not to the particular detailed configurations thereof. Accordingly, the structure, methods, functions, control and arrangement of components and circuits have, for the most part, been illustrated in the drawings by readily understandable block representations and schematic diagrams, in order not to obscure the disclosure with structural details which will be readily apparent to those skilled in the art, having the benefit of the description herein. Further, the inventive concepts disclosed herein are not limited to the particular embodiments depicted in the diagrams provided in this disclosure, but should be construed in accordance with the language in the claims.

A global positioning system (GPS) guided munition can include a GPS receiver that provides positioning and navigational capabilities. As used herein, GPS guided munitions can include ammunition projectiles, weapon projectiles, or other projectiles equipped with GPS receivers to navigate along a certain path and/or to a target location. The GPS receiver can receive GPS signals from various satellites or pseudolites, for example, while the GPS guided munition is traversing any medium towards an intended target or destination. The GPS receiver can be incorporated as part of a drone or other craft or device. The GPS receiver can continually (or repeatedly) determine the location, speed, or direction of its host (e.g., the guided GPS munition) based on received sets of GPS signals. The GPS guided munition can include mechanisms or systems (e.g., electro-mechanical systems) to adjust the munition's navigation path based on the determined locations, speed(s), or direction(s) of the GPS guided munition. Accordingly, integrating a GPS receiver in a munition for example, allows that munition to navigate more accurately (e.g., compared to one without a GPS receiver) towards a target in various environmental conditions. For instance, the GPS receiver can have access to GPS signals from satellites or pseudolites in spite of rain, snow, clouds, wind, or any other environmental conditions.

GPS guided munitions can be subject to other hostile conditions. For instance, in a military environment, jamming can play a substantial role in interfering with radio communications. Jammers can transmit radio frequency (RF) signals at frequency bands used by GPS to interfere with GPS signals transmitted by satellites or pseudolites. Frequency bands used by GPS can include a L1 frequency band centered at 1575.42 MHz, a L2 frequency band centered at 1227.60 MHz, and a L5 frequency band centered at 1176.45 MHz. A GPS receiver can be configured to (e.g., can include circuitry to) receive GPS signals over multiple frequency bands, such as any combination of the L1, L2 and L5 frequency bands. Jammers can also transmit jamming RF signals over multiple frequencies simultaneously or alternately, for example, to jam GPS signals transmitted over various frequency bands or GPS signals transmitted by various satellites. Jamming signals transmitted by RF jammers can prevent GPS receivers from accurately decoding received GPS signals.

GPS receivers can employ anti jamming techniques to overcome the effect of jamming. However, implementing anti jamming techniques in GPS receivers can add to the complexity and cost of the GPS receivers. For instance, anti jamming techniques can call for multiple radio frequency (RF) channels to be supported. The number of RF channels to be supported by GPS receivers can increase as the number of jammers increases. For example, when jamming is performed by n jammers, reliable anti jamming may call for GPS receivers to support n+1 RF channels. Accordingly, as the number of RF channels supported by a GPS receiver increases, the capability of that GPS receiver to overcome sophisticated jamming increases.

However, the increase of RF channels supported by a GPS receiver leads to increased hardware (or circuit components) within the GPS receiver. Also, the increase in hardware used can lead to increased hardware size or bulk (e.g., usage of space for additional circuitry), and therefore, increased GPS receiver size. In some applications, such as munition projectiles or drones, the space allocated to a GPS receiver can be limited resulting in a tradeoff between size or hardware space and reliable anti-jamming. To address this tradeoff, embodiments of GPS receivers that support multiple (e.g., two, three or more) RF channels while efficiently using hardware space are described herein.

Referring now to the drawings, FIG. 1 shows a block diagram illustrating an embodiment of a global positioning system (GPS) receiver circuit 100 that is capable of receiving GPS signals over multiple radio frequency (RF) channels, according to inventive concepts of this disclosure. The GPS receiver circuit 100 includes a plurality of parallel circuits associated with a plurality of RF channels. Each of the parallel circuits includes a frequency demultiplexer 102, two or more low noise amplifiers (LNAs) 104, two or more bandpass filters (BPFs) 106a and 106b (also referred to individually or collectively as BPF 106), and/or a RF downconverter 110. The frequency demultiplexer 102, the LNAs 104 and the BPFs 106 in each of the parallel circuits form a RF unit or module 108. The GPS receiver circuit 100 also includes one or more analog-to-digital converters (ADCs) 112 coupled to the RF converters 110.

The GPS receiver circuit 100 can receive GPS signals over three or more RF channels. For instance, versions of a GPS signal transmitted by a satellite or a pseudolite can be received by a plurality of RF channels of the GPS receiver circuit 100 (or a respective GPS receiver) The GPS signal received over each RF channel can be a multi-frequency GPS signal. For instance, each GPS signal received over a given (or each) RF channel can include multiple frequency components associated with, for example, the L1 frequency band, L2 frequency band, L5 frequency band, other frequency band used by satellites or pseudolites, or a combination thereof. Redundancy of information transmitted over the plurality of RF channels can be used for anti-jamming.

Each frequency demultiplexer 102 (e.g., diplexer) can be associated with a respective RF channel, and receive GPS signals transmitted over that RF channel. Each frequency demultiplexer 102 can be coupled to a respective RF connector (not shown in FIG. 1). The RF connectors may be coupled to one or more antennas for receiving GPS signals. Each frequency demultiplexer 102 can include two or more bandpass filters (not shown in FIG. 1). The bandpass filters of each frequency demultiplexer 102 can receive a GPS signal and can output separate frequency components of the GPS signal. For example, if the GPS signals transmitted over each RF channel include signal components associated with the L1 frequency band and the L2 frequency band, the frequency demultiplexer 102 be a dual band (e.g., L1/L2) diplexer that has a first bandpass filter having a pass band associated with (or equal to) the L1 frequency band and a second bandpass filter having a pass band associated with (or equal to) the L2 frequency band. In the case where the GPS signals transmitted over each RF channel include signal components associated with the L1 frequency band, the L2 frequency band, and the L5 frequency band, the frequency demultiplexer 102 can include three bandpass filters having pass bands associated with (or equal to) the L1 frequency band, the L2 frequency band, and the L5 frequency band, respectively. Accordingly, the frequency demultiplexer 102 can receive a GPS signal as input and can output multiple signal components associated with the frequency bands present in the GPS signal. That is, each frequency demultiplexer 102 can separate the GPS signal components, associated with a plurality of frequency bands, within a GPS signal. Each frequency demultiplexer 102 can include a plurality of output ports, and can output each GPS signal component through a respective output port of the plurality of output ports. The number of bandpass filters within each frequency demultiplexer 102 can be equal to the number of frequency bands present in received GPS signals.

Each frequency demultiplexer 102 can be coupled to multiple LNAs 104 that are arranged in parallel to one another. The number of LNAs coupled to each frequency demultiplexer 102 can be equal to the number of bandpass filters in that frequency demultiplexer 102 and/or equal to the number of GPS signal components output by that frequency demultiplexer 102. GPS signals received by the GPS receiver circuit 100 and respective GPS signal components output by the frequency demultiplexers 102 can have very low power. Each LNA 104 can amplify GPS signal components received from the frequency demultiplexer 102 coupled to that LNA 104. Each LNA 104 can amplify GPS signal components associated with a respective frequency band (e.g., L1 frequency band, L2 frequency band, or L5 frequency band). For example, in the case where two LNAs 104 are coupled to each frequency demultiplexer 102, a first LNA 104 can amplify the power of GPS signal components associated with the L1 frequency band while the other LNA 104 can amplify the power of GPS signal components associated with the L2 frequency band.

The LNAs 104 associated with distinct frequency bands (e.g., L1 frequency band, L2 frequency band, or L5 frequency band) can be similar to one another, or can have different characteristics based on, for example, the associated frequency bands. For example, LNAs 104 associated with distinct frequency bands may have different power gain characteristics in terms of frequency. In some implementations, the LNAs 104 may provide a power gain up to 20 decibels (dB) and may reduce the signal-to-noise ratio (SNR) of the GPS signal components by 3 dB or less. While the LNAs 104 may improve the SNR of the GPS signal components received from the frequency demultiplexer 102, the amplification of the GPS signal components can result in increased out-of-band noise. For example, the signal noise outside the L1 frequency band, the L2 frequency band, or the L5 frequency band may increase at the output of the LNAs 104. Such increase in out-of-band signal noise can be reduced using the BPFs 106.

Each LNA 104 can be coupled to a respective BPF 106. The BPFs 106 can be analog filters. The BPFs 106 can eliminate out-of-band noise such as noise added by the LNAs 104. The pass bands of the BPFs 106 can vary depending on the frequency band associated with the GPS signal components processed by each BPF 106. For example, the BPFs 106a may be associated with the L1 frequency band while the BPFs 106b may be associated with the L2 frequency band. In some embodiments, the GPS receiver circuit 100 can include BPFs 106 associated with the L1 frequency band, the L2 frequency band, and the L5 frequency band if GPS signals associated with each (or at least one) RF channel are tri-frequency (e.g., L1/L2/L5) signals. The BPFs 106 can be (or can include) bulk acoustic wave (BAW) filters. The BPFs 106 can be (or can include) surface acoustic wave (SAW) filters. SAW filters can achieve a SNR between 30 to 40 dB. Also, Surface Acoustic Wave (SAW) technology allows for relatively small size filters (compared to other filtering technologies such as ceramic filters) and a sharp roll off for rejection. The sharper the roll off, the closer the jammer can get to the in-band signal content without affecting performance thus increasing robustness of anti jam design. The roll off can allow mitigation of jamming close in proximity to the GPS band. Also, since BAW filters can be typically larger in size than SAW filters, the use of Baw filters can lead a larger size of the RF chip (e.g., greater than 3.5×3.5×1.2 mm) compared to when using SAW filters.

For projectile applications, the use of a plurality of RF channels, e.g., to mitigate jamming, leads to an increase in the number of filters within the GPS receiver circuit 100. Implementing such filters as separate (or discrete) components can lead to substantial increase in the size of (or hardware space occupied by) the GPS circuit receiver 100. Also, integrating the filters or a subset thereof into a RF chip or IC poses technical challenges especially with regard to system design of such RF chip or IC. In particular, integrating each individual component (e.g., SAW filter) in the RF chip can involve designing that individual component such that respective parasitics (or parasitic effects) meet pre-defined criteria. For a RF chip including a plurality of SAW filters (or other BAW filters), a plurality of LNAs, and frequency demultiplexer, satisfying pre-defined criteria (or constraints) with regard to the parasitics of all these components (once integrated in the RF chip) increases the design complexity of the RF chip. The complexity of the design makes the integration of SAW (or Baw) filters into a RF chip uncommon.

The BPFs 106 associated with the each frequency band may have a pass band that overlaps with that frequency band. For example, the BPFs 106a for processing GPS signal components associated with the L1 frequency band may have a pass band centered at about 1575.42 MHz (e.g., 1575.42±2 MHz) and be centered at the BPFs 106b for processing GPS signal components associated with the L2 frequency band may have a pass band centered at about 1227.60 MHz (e.g., 1227.60±2 MHz). The width of the pass band of any of the BPFs 106 may be about 20 MHz (e.g., within ±2% thereof), 30 MHz (e.g., within ±2% thereof), 40 MHz (e.g., within ±2% thereof), 50 MHz (e.g., within ±2% thereof), 100 MHz (e.g., within ±2% thereof), or other bandwidth value defined based on the bandwidth of GPS signal components to be processed by that BPF 160 or based on the bandwidth of a respective frequency band (e.g., L1 frequency band, L2 frequency band, or L5 frequency band).

Filtered GPS signal components output by BPFs 106 associated with each RF channel (or associated with each frequency demultiplexer 102) are provided as input to a respective RF downconverter 110. The RF downconverter 110 can shift each of the input GPS signal components in frequency to decrease the center frequency of each GPS signal component. For example, the RF downconverter 110 can shift the GPS signal components received from the BPFs 106 to the baseband (e.g., centered at the zero frequency). The RF downconverter 110 may shift the center frequencies of the GPS signal components received from the BPFs 106 to one or more frequencies that are, for example, substantially smaller than the center frequencies of the L1, L2, and/or L5 frequency bands. For example, the new center frequencies of the GPS signal components can be less than 50 MHz, 100 MHz, 150 MHz, or 200 MHz. The down conversion of the GPS signal components can lead to a substantial reduction (e.g., by a factor of 10 or more) in the Nyquist sampling rate of each of the GPS signal components. Each RF downconverter can include a frequency mixer and bandpass filter.

Frequency-shifted GPS signal components output by the RF downconverters 110 can be fed to one or more analog-to-digital converts (ADC) 112. In some implementations, a single ADC 112 capable of sampling multiple analog signals (e.g., all GPS signal components output by the plurality of RF downconverters 110) simultaneously can be employed. In some implementations, multiple ADCs 112 can be employed. The one or more ADCs 112 may sample the GPS signal components received from the plurality of RF downconverters 110 according to a sampling frequency defined based on the Nyquist sampling rates of the frequency-shifted GPS signal components. Due to the down conversions performed by the RF downconverters 110, the one or more ADCs 112 can operate at a substantially smaller sampling frequency and can generate a substantially smaller number of samples compared to a scenario where no down conversion is performed. The reduction in the number of samples can lead to a reduction in the computational complexity associated with processing the digital signals output by the one or more ADCs 112.

The one or more ADCs 112 can provide the digital signals generated by sampling the frequency-shifted GPS signal components to a processor (not shown in FIG. 1), such as a general purpose microprocessor, a digital signal processor (DSP), an application-specific instruction set processor (ASIP), or the like. The processor can perform anti jamming processes, decode the GPS signal components or corresponding codes, determine the location of the GPS receiver based on information decoded from the GPS signal components, or a combination thereof.

The frequency demultiplexer 102, the LNAs 104 and the BPFs 106 associated with each RF channel can be viewed as (or assembled into) a RF module 108. Each RF module 108 can include a frequency demultiplexer 102 coupled to two or more parallel circuits. Each of the parallel circuits can include a LNA 104 and a BPF 106, and can be associated with a respective frequency band (e.g., the L1 frequency band, the L2 frequency band, or the L5 frequency band). In some implementations, the RF downconverter 110 may also be part of the RF module 108. The RF module 108 may be implemented differently (e.g., compared to the configuration shown in FIG. 1). For instance, each RF module 108 may include a high-pass filter, a LNA 104 connected in series to the high-pass filter, a low-pass filter connected in series to the LNA 104, and a frequency demultiplexer 102 connected in series to the low-pass filter. The RF module 108 may also include two or more BPFs 106 arranged in parallel to each other and connected to the frequency demultiplexer 102. While such implementation of the RF module 108 includes a single LNA 104, it has two filters (e.g., the low-pass filter and the high-pass filter arranged, respectively, ahead of and following the LNA 104) more than the RF module configuration shown in FIG. 1. The use of extra filters can lead to an increase in circuit (or hardware) space and power consumption.

Figure 2:
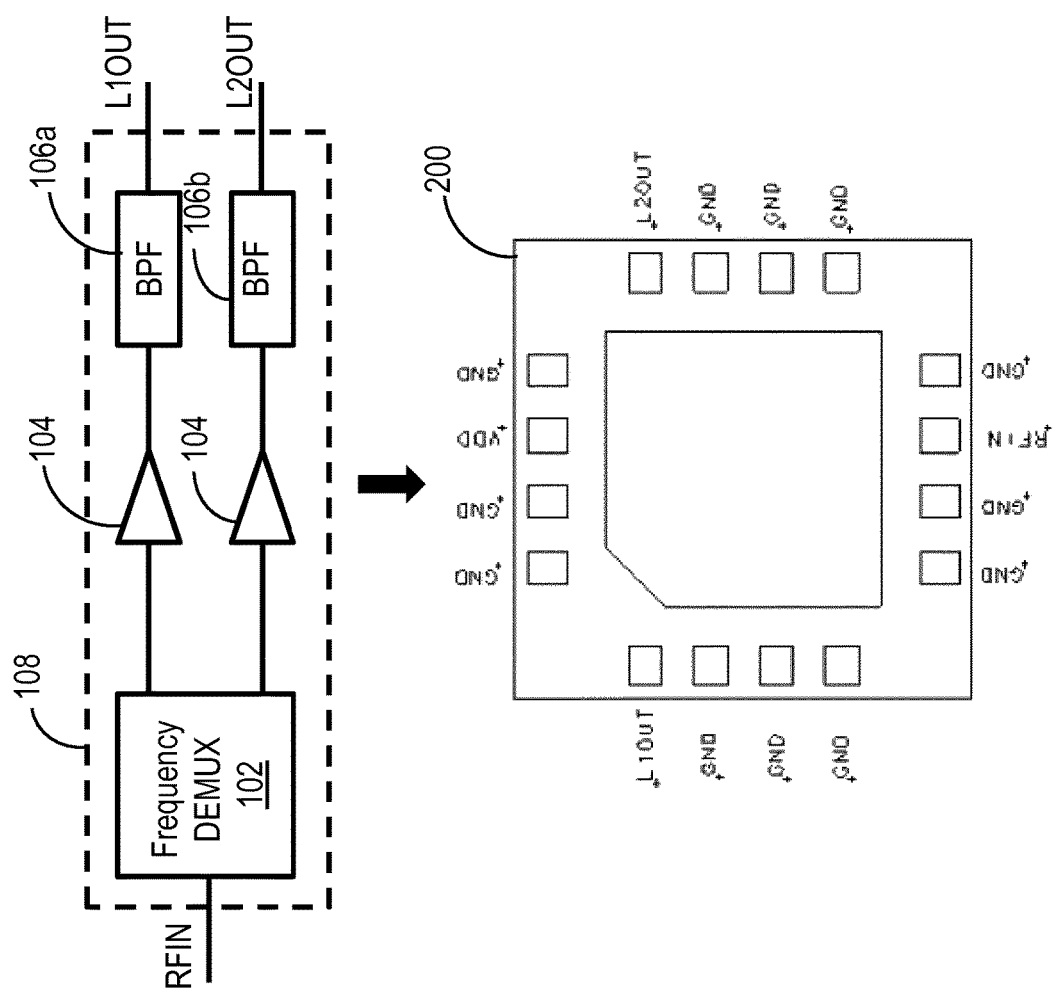
FIG. 2 shows a block diagram illustrating an example embodiment of a RF chip implementing a RF module 108, according to inventive concepts of this disclosure.

Referring now to FIG. 2, a block diagram illustrating an example embodiment of a RF chip implementing the RF module 108 is shown. In one or more embodiments, the RF module 108 represents a module that includes at least 5 electrical components (e.g., one frequency demultiplexer 102, at least two LNAs 104, and at least two BPFs 106), and that can be repeated multiple times within the GPS receiver circuit 100. As such, the RF module 108 can occupy substantial circuit (or hardware) space if implemented as discrete components. In other words, implementing the frequency demultiplexer 102, the LNAs 104, and the BPFs 106 within each RF module 108 as separate physical components can lead to an increase in circuit (or hardware) occupied space and/or an increase in power consumption. To overcome these problems, each RF module can be implemented as a single RF chip 200, or as a single integrated circuit (IC) or within a single electronic package 200 such as a monolithic microwave integrated circuit (MMIC). In some implementations, two or more RF modules 108 can be implemented as a single chip RF 200, or a single IC or packaged part 200. For instance, all the RF modules 108 within the GPS receiver circuit 100 may be implemented as a single RF chip 200 (or a single IC or packaged part 200). Accordingly, the GPS receiver circuit 100 can include one or more RF chips 200 (or one or more ICs 200) each of which incorporates one or more RF modules 108.

The implementation of the RF modules 108 as RF chips leads to a substantial reduction in the circuit (or hardware)

space occupied by the GPS receiver circuit 100 or the corresponding GPS receiver device. For instance, a dual band (L1/L2) RF module 108 (such as the one shown in FIGS. 1 and 2) can be implemented in a RF chip having a size of 3.5×3.5×1.2 millimeter (mm). Such reduction in circuit (or hardware) space is important in many applications where the space allocated to the GPS receiver device is limited or constrained by design. For example, in military applications involving integration of a GPS receiver device into a munition projectile, the breadth (e.g., diameter, width, or length) of the GPS receiver device may be constrained to be smaller than or equal to 1.75 inch, 1.7 inch or 1.65 inch as examples. Also, the height or depth of the GPS receiver device may be constrained to be equal to or less than 1.05 inch, 1 inch, or 0.95 inch for example. In particular, a fuse integrated within the munition projectile and configured to contain, interface with, and/or hold the GPS receiver device can have a specified size (e.g., diameter, or length and width, a depth or height, or a combination thereof). On one hand, such size constraint can limit the amount of hardware (or electric components) in the GPS receiver circuit 100. On the other hand, sophisticated jamming techniques (e.g., the use of multiple signal jammers) calls for the use of more RF channels, and therefore, the use of more RF hardware (e.g., more RF modules 108 and more RF downconverters 110). The implementation of each RF module (or one or more RF modules) into a single RF chip 200 allows for satisfying both the size constraint and supporting multiple (e.g., three or more) RF channels to allow reliable anti-jamming.

In the RF chip 200 of FIG. 2, the GND pins indicate pins that are coupled to the electric ground. The VDD pin is the power supply pin. The RFIN pin may correspond to the input pin to receive the GPS signal associated with a respective RF channel. The L1OUT pin may be an output port for providing the output of the BPF 106a associated with the L1 frequency band. The L2OUT pin may be an output port for providing the output of the BPF 106b associated with the L2 frequency band. While the RF chip 200 shown in FIG. 2 is a dual band RF chip by way of illustration, The RF chip 200, in general, can be tri-band or can support more than 3 frequency bands. In such cases, the number of output ports of the RF chip can be greater than two and equal to the number of frequency bands supported by the RF module 108 or the RF chip 200.

Each RF module 108 (or RF chip 200) can have a power gain between 3 and 20 dBs. Each RF module 108 (or RF chip 200) can have an operational frequency range between about 1560 MHz (e.g., within ±0.1% thereof) and about 1591 MHz (e.g., within ±0.1% thereof) for the L1 frequency band. Each RF module 108 (or RF chip 200) can have an operational frequency range between about 1212 MHz (e.g., within ±0.1% thereof) and about 1543 MHz (e.g., within ±0.1% thereof) for the L2 frequency band. Each RF module 108 (or RF chip 200) can achieve an out-of-band attenuation, e.g., relative to the center frequency of the corresponding frequency band (e.g., L1, L2, or L5 frequency band), greater than or equal to 45 decibels relative to the carrier (dBc), or 50 dBc, 55 dBc, or 60 dBc. Each RF module 108 (or RF chip 200) can support a continuous wave (CW) input RF power up to 20 decibel-milliwatts (dBm), and a pulsed input RF power up to 30 decibel-milliwatts (dBm). In other words, the GPS receiver circuit 100 having RF chips 200 can support relatively high input RF power (e.g., compared to other GPS receiver circuits). Also, each RF module (or RF chip or packaged part 200) can handle 0 dBm of out of band interference (CS104) without impacting the overall noise figure of the RF module 108. That is, each RF module can withstand high out of band noise power (jammer) without degrading system performance (e.g., tracking carrier to noise (C/No) ratio). If the noise was to increase in the presence of an out of band jammer tracking performance would degrade.

Figure 3:
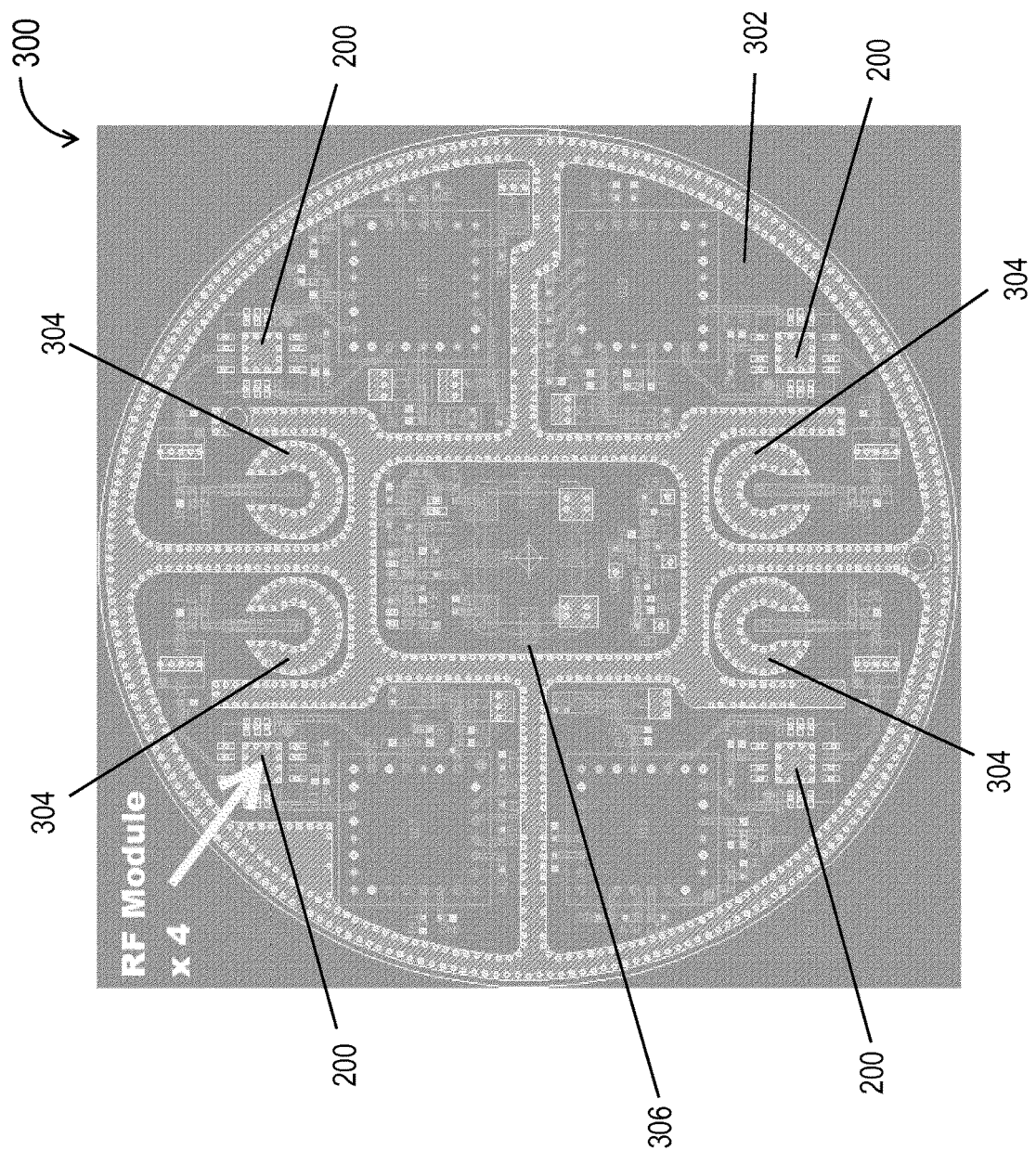
FIG. 3 shows an image illustrating an example embodiment of a GPS receiver device supporting four RF channels, according to inventive concepts of this disclosure.

Referring to FIG. 3, an image illustrating an example embodiment of GPS receiver device 300 supporting four RF channels is shown. The GPS receiver device 300 can include a circuit board 302, four RF connectors 304, four RF chips 200, and a temperature compensated crystal oscillator (TCXO) 306. The GPS receiver device 300 can be integrated in a projectile munition. For example, the GPS receiver device 300 can be configured to be inserted (or enclosed) within a fuse integrated in a projectile munition. The GPS receiver device 300 may also be employed in other applications, such as integrated within a drone, integrated within vehicles, integrated within communication devices, integrated within robots, or integrated in other devices.

The circuit board (or printed circuit board) 302 (or the GPS receiver device 300) can have a circular, or oval, shape as shown in FIG. 3. The circuit board 302 (or the GPS receiver device 300) can have a diameter less than or equal to 1.65 inch. The circuit board 302 (or the GPS receiver device 300) can have a depth (or height) less than or equal to 0.95 inch. The circuit board 302 can include various circuit components of the GPS receiver circuit 100 as well as other components such as a processor for decoding information encoded in received GPS signals and determining the geographical location of the GPS receiver device based on the decoded information.

The GPS receiver device 300 can include four RF connectors 304 associated with four RF channels supported by the GPS receiver device 300. Each RF connector 304 can be printed on the circuit board 302. Each RF connector 304 can receive GPS signals associated with a respective RF channel. Each RF connector 304 can be coupled to a respective RF chip 200. In some embodiments, each RF chip 200 includes and/or implements a single RF module 108. Each RF chip 200 can include and/or implement a dual band RF module (e.g., L1/L2), a tri-band RF module (L1/L2/L5), or other multi-band module (e.g., having or supporting more than three frequency bands).

While the GPS receiver device 300 of FIG. 3 is shown to support four RF channels, in general, the GPS receiver device 300 can support three RF channels (e.g., having three RF connectors 304 and three RF chips), or more than four RF channels (e.g., with RF chip(s) 200 implementing two or more RF modules each). Also, while the GPS receiver device 300 (or the circuit board 302) of FIG. 3 is shown to have a generally circular (or oval) shape or structure, other shapes or structures are contemplated by embodiments described herein. For example, the GPS receiver device 300 (or the circuit board 302) can have a square shape or structure with width less than or equal to 1.75 inch, 1.7 inch, or 1.65 inch, a rectangular shape with a length less than or equal to 1.75 inch, 1.7 inch, or 1.65 inch, a hexagonal shape with a breadth less than or equal to 1.75 inch, 1.7 inch, or 1.65 inch, an octagonal shape with a breadth less than or equal to 1.75 inch, 1.7 inch, or 1.65 inch, or other shape or structure.

The GPS receiver device 300 can include the TCXO 306. The TCXO 306 can be arranged in the center of the circuit board 302, for example, to reduce the effect spin can have on oscillator performance in projectile applications. The TCXO 306 can be mounted on the top side to reduce the effect shock can have on oscillator performance/survivability in projectile applications.

The GPS receiver device 300 can also include a casing (not shown in FIG. 3) to enclose the circuit board 302. For instance, the casing can be designed to engage or contain the perimeter of the circuit board 302. The casing may provide protection and/or shielding to the circuit board 302. Also, the casing may be designed to engage, host, receive or contain the fuse integrated in a munition projectile or a device to host the GPS receiver device 300. The casing can be made of a plastic material, a rubber material, a metal, or a combination thereof. The casing or the circuit board may be mechanically attached to a munition projectile or a device to host the GPS receiver device 300 via screws, clips, glue, or other mechanical coupling mechanisms.

Figure 4:
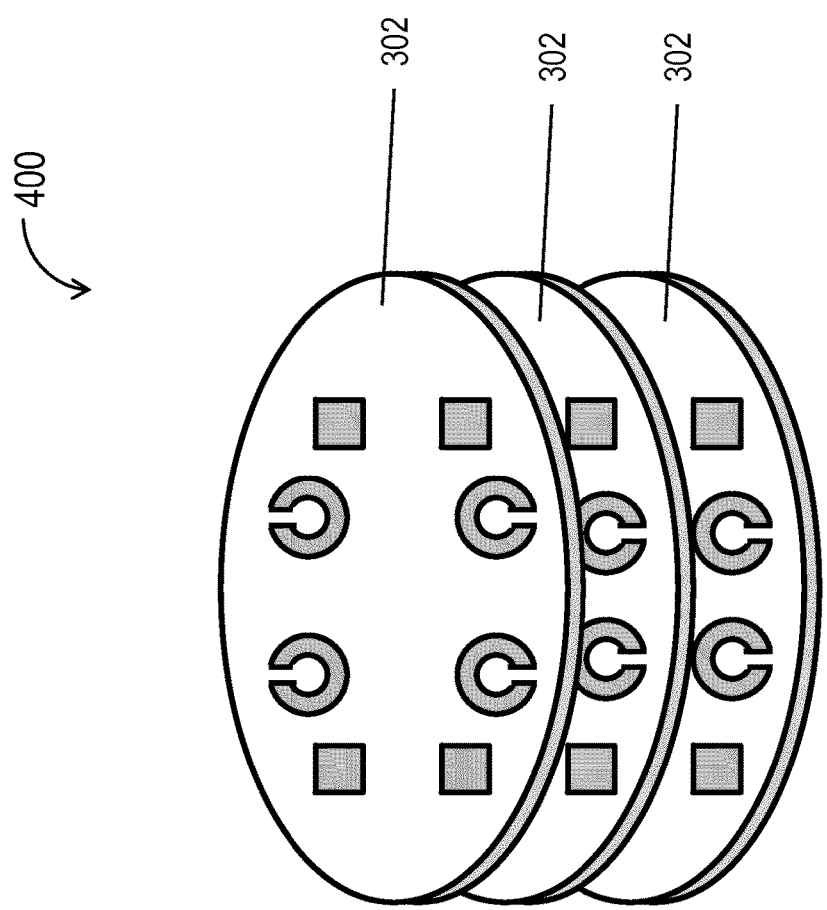
FIG. 4 shows a diagram illustrating an example embodiment of a GPS receiver device having multiple vertically arranged circuit boards, according to inventive concepts of this disclosure.

Referring to FIG. 4, a diagram illustrating an example embodiment of a GPS receiver device 400 having multiple vertically arranged circuit boards 302 is shown. In order to support more than four RF channels, multiple circuit boards 302 each representing a GPS receiver circuit supporting four RF channels can be arranged (or stacked) above one another according to vertical configuration. Such vertical configuration allows for satisfying a breadth (e.g., diameter, length, or width) constraint while supporting a number of RF channels larger than that supported by a single circuit board 302. Even with the implementation of RF modules 108 as RF chips 200, the number of RF channels that can be supported by a circuit board 302, for example, having breadth less than or equal to 1.65 inch may still be constrained by the size of the circuit board.

Designing, or manufacturing, the GPS receiver device 400 as a vertical stack of circuit boards 302, each supporting multiple RF channels, can substantially increase the total number of RF channels that can be supported by the GPS receiver device 400. For example, the GPS receiver device 400 shown in FIG. 4 has three circuit boards 302 each of which includes a GPS receiver circuit that supports four RF channels. As such, the GPS receiver device 400 shown in FIG. 4 can support a total number of RF channels less than or equal to 12.

The circuit boards 302 in the GPS receiver device 400 can be coupled to one another. For example, outputs from ADCs 112 on the various circuit boards can be fed as input to a processor (e.g., located on one of the circuit boards 302) for anti jamming processing and/or decoding of information embedded in the GPS signals. While the GPS receiver device 400 illustrated in FIG. 4 include three circuit boards 302, in general, the number of circuit boards 302 can vary depending on the application and/or the constraint on the depth or height of the GPS receiver device 400. Also, the number of RF connectors 304 and the number of RF chips 200 on each circuit boards may vary (e.g., may be greater than or equal to three) depending on the circuit design employed. The configuration shown is merely illustrative and indicates that any number of RF channels can be obtained by using one or multiple ones of the same or different GPS receiver circuits (such as GPS receiver circuit 100) with the appropriate number of RF channels.

Figure 5:
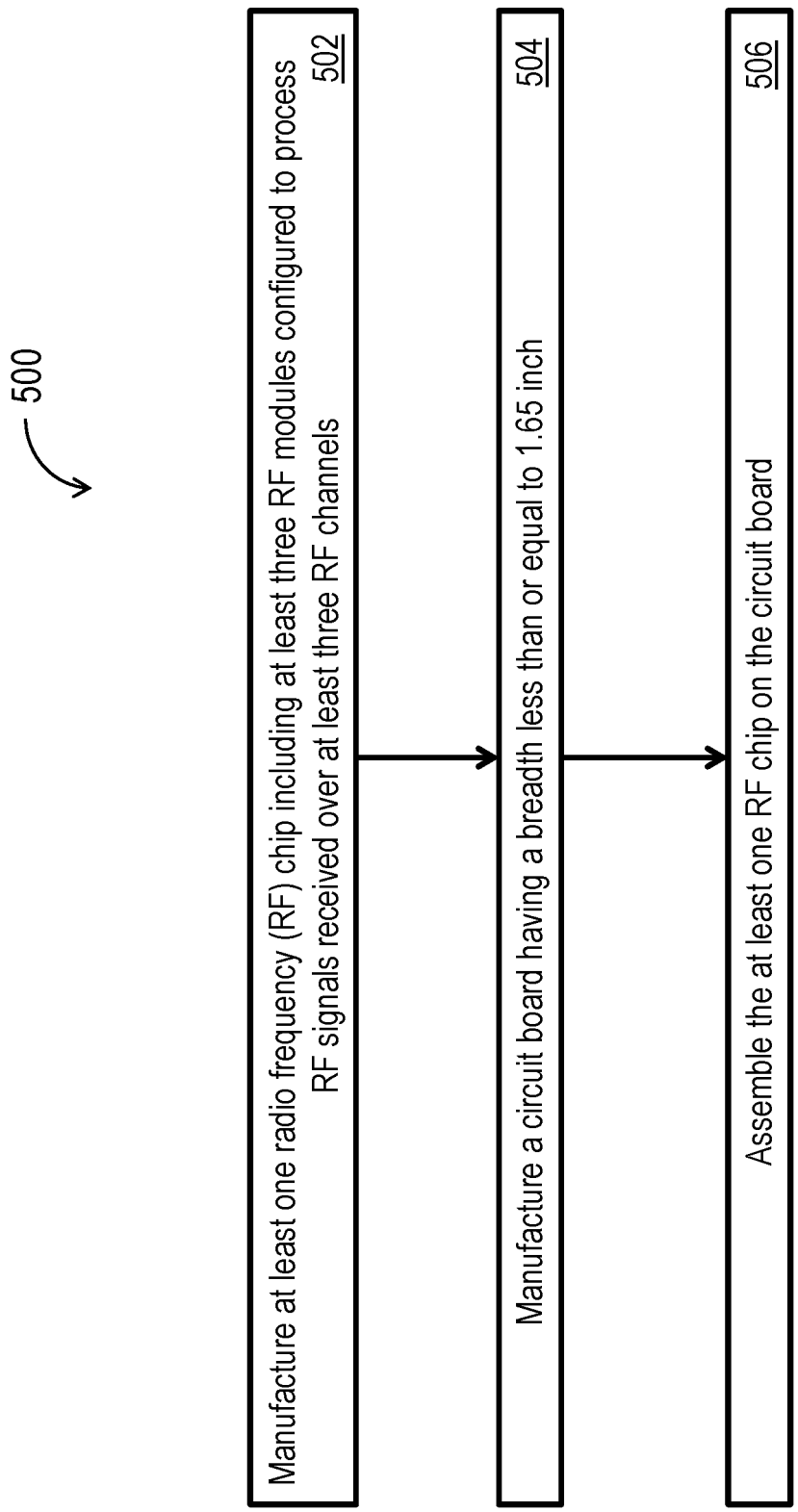
FIG. 5 shows a flow chart illustrating one embodiment of a method for manufacturing or producing a global positioning system (GPS) receiver device that supports a plurality of RF channels, according to inventive concepts of this disclosure.

Referring to FIG. 5, a flow chart illustrating one embodiment of a method 500 for producing or manufacturing a global positioning system (GPS) receiver device that supports a plurality of RF channels. The method 300 can include producing at least one radio frequency (RF) chip including at least three RF modules configured to process RF signals received over at least three RF channels (step 502). The method can 500 include producing a circuit board having a breadth less than or equal to 1.65 inch (step 504), and assembling the at least one RF chip on the circuit board (step 506).

The method 500 can include manufacturing at least one radio frequency (RF) chip 200 including at least three RF modules configured to process RF signals received over at least three RF channels (step 502). As discussed with regard to FIGS. 1-4, each RF chip 200 can include three or more RF modules 108. Each RF module 108 can be associated with a respective RF channel. Each RF module 108 can include a frequency demultiplexer 102 and at least two parallel circuits coupled to the frequency demultiplexer 102. Each of the parallel circuits can include a RF amplifier (e.g., a LNA 104) connected to a respective output port of the frequency demultiplexer 102 and an analog bandpass filter connected in series to the RF amplifier. Producing the RF chip(s) 200 can include manufacturing, fabricating or otherwise providing one or more integrated circuits, such as a MMIC(s), that implement at least three RF modules 108. The RF modules 108 are as described with regard to FIGS. 1-4. In some implementations, each chip (or IC or packaged part) implements a respective single RF module 108. In some implementations, a manufactured chip (or IC or packaged part) may implement more than one RF module 108.

The method 500 can include producing a circuit board (or printed circuit board) including a GPS receiver circuit 100 and having a breadth less than or equal to 1.65 inch (step 504). Producing the circuit board can include manufacturing fabricating or printing at least a portion of the GPS receiver circuit (such as GPS receiver circuit 100 shown in FIG. 1) on the circuit board. For instance, the method 500 can include fabricating or printing the portion(s) or the components (including connections between separate components) of the GPS receiver circuit 100 that are not implemented as separate integrated circuits or separate chips.

The method 500 can include assembling the at least one RF chip 200 on the circuit board 302 (step 506). Assembling the at least one RF chip 200 on the circuit board 302 can include soldering the at least one RF chip 200 to the circuit board 302. For instance, the method 500 can include soldering each of the pins of each RF chip 200 to corresponding circuit elements (or locations) on the circuit board 302. The method 500 may include soldering other chips (or ICs) to the circuit board 302. For example, the method 500 may include soldering RF downconverters 110 implemented as MMICs or ADC(s) 112 to the circuit board. The method 500 may further include enclosing the circuit board within a casing. The casing may provide protection and/or shielding for the circuit board 302. Also, the casing may be designed to engage a fuse integrated in a munition projectile or a device to host the GPS receiver device 300. The casing can be made of a plastic material, a rubber material, a metal, or a combination thereof.

Figure 6:
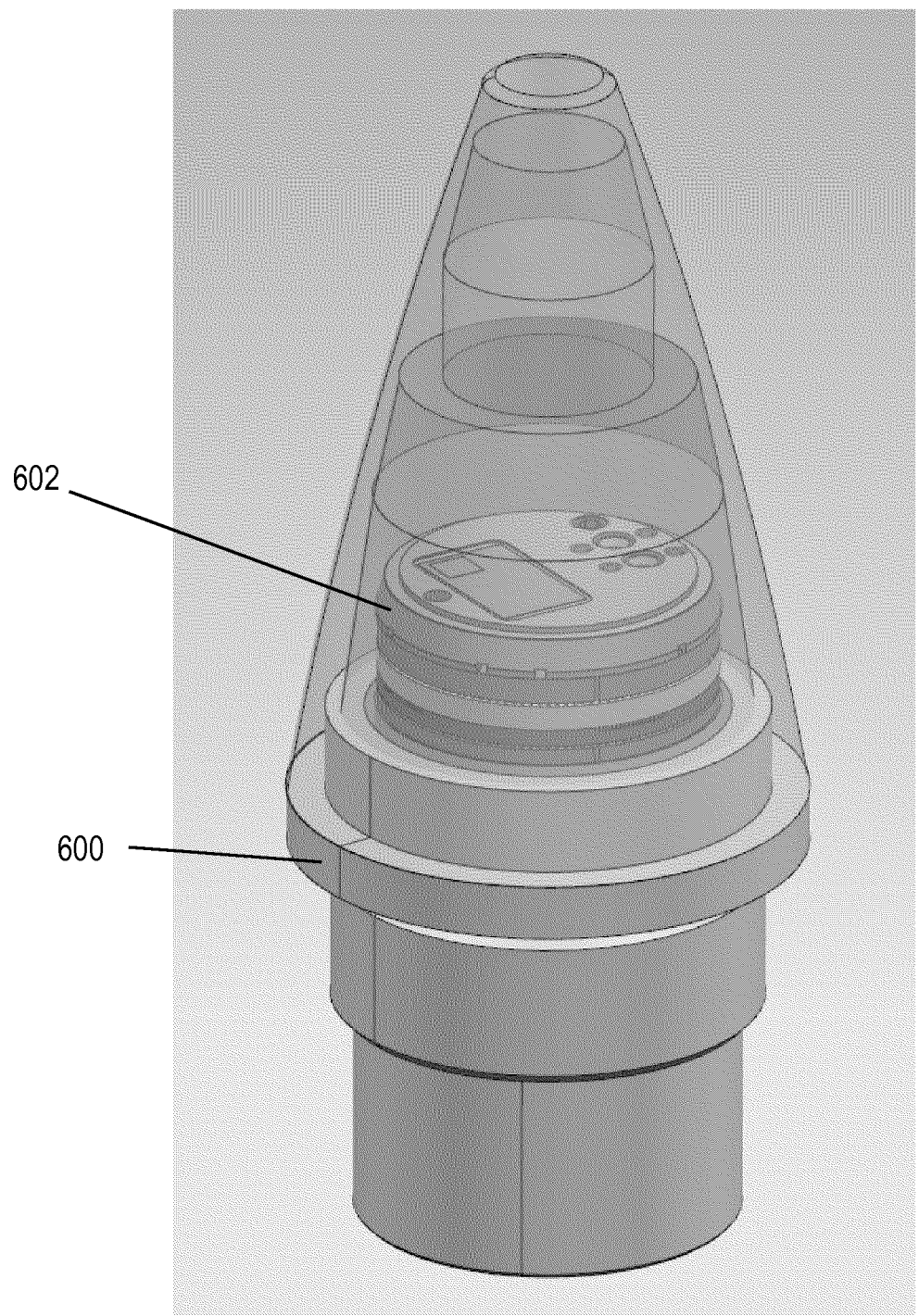
FIG. 6 shows a diagram illustrating an example embodiment of a projectile with a GPS receiver integrated therein, according to inventive concepts of this disclosure.

Referring to FIG. 6, a diagram illustrating an example embodiment of a projectile 600 (such as a munition projectile) with a GPS receiver device 602 integrated therein is shown, according to inventive concepts of this disclosure. The GPS receiver device 602 can be arranged along the longitudinal axis of the projectile 600. As such, the diameter or breadth of the GPS receiver device 602 can be constrained by the diameter or the breadth of projectile. It should be appreciated that the shape and/or configuration of the projectile 600 shown in FIG. 6 are not limiting and other shapes or configurations may be contemplated.

While embodiments disclosed herein are described as devices and methods specific to GPS systems and GPS signals, a person skilled in the art would appreciate that similar devices and methods for Russian global orbiting navigational satellite system (GLONASS) systems and signals can be implemented according to embodiments described herein.

The construction and arrangement of the systems and methods are described herein as illustrative examples and are not to be construed as limiting. Although only a few embodiments have been described in detail in this disclosure, many modifications are possible (e.g., variations in sizes, dimensions, structures, shapes and proportions of the various elements, values of parameters, mounting arrangements, use of materials, colors, orientations). For example, the position of elements may be reversed or otherwise varied and the nature or number of discrete elements or positions may be altered or varied. Accordingly, all such modifications are intended to be included within the scope of the inventive concepts disclosed herein. The order or sequence of any operational flow or method of operations may be varied or re-sequenced according to alternative embodiments. Other substitutions, modifications, changes, and omissions may be made in the design, operating conditions and arrangement of the exemplary embodiments without departing from the broad scope of the inventive concepts disclosed herein.

What is claimed is:

1. A global positioning system (GPS) receiver device comprising:
    at least three radio frequency (RF) chips including at least three RF modules configured to process RF signals received over at least three RF channels, each RF module associated with a respective RF channel of the at least three RF channels and including (1) a frequency demultiplexer coupled to one or more antennas via a respective RF connector, and (2) at least two parallel circuits coupled to the frequency demultiplexer, each of the parallel circuits including (i) a RF amplifier connected to a respective output of the frequency demultiplexer and (ii) an analog bandpass filter connected in series to the RF amplifier, each RF module integrated in a respective RF chip of the at least three RF chips; and
    a circuit board on which the at least three RF chips are mounted, the circuit board having a breadth less than or equal to 1.65 inch.

2. The GPS receiver device of claim 1 having a height less than or equal to 0.95 inch.

3. The GPS receiver device of claim 1 further comprising a casing enclosing the circuit board.

4. The GPS receiver device of claim 1, wherein the RF signals received over each RF channel include at least two signal components associated with at least two frequency bands, and the frequency demultiplexer is configured to separate the at least two signal components and provide each signal component for processing on a respective circuit of the at least two parallel circuits.

5. The GPS receiver device of claim 4, wherein the at least two frequency bands include at least two of a L1 band, a L2 band, and a L5 band.

6. The GPS receiver device of claim 1 further comprising:
    one or more analog-to-digital converters (ADCs); and
    at least three RF down-conversion devices, each down-conversion device configured to frequency-shift output signals provided by a respective RF chip and provide the frequency-shifted signals as input to the one or more ADCs.

7. The GPS receiver device of claim 6 further comprising:
    a processor for performing anti jamming processing on digital signals output by the one or more ADCs.

8. The GPS receiver device of claim 1, wherein the analog bandpass filters associated with the parallel circuits include surface acoustic wave (SAW) filters.

9. The GPS receiver device of claim 1, wherein the analog bandpass filters associated with the parallel circuits include bulk acoustic wave (BAW) filters.

10. The GPS receiver device of claim 1, wherein each RF module has an out-of-band attenuation greater than or equal to 60 decibels relative to the carrier (dBc).

11. The GPS receiver device of claim 1 being capable of supporting input power equal to 20 dBm.

12. The GPS receiver device of claim 1 having a circular shape and a diameter less than or equal to 1.65 inch.

13. A method of producing a global positioning system (GPS) receiver device, the method comprising:
    producing at least three radio frequency (RF) chip including at least three RF modules configured to process RF signals received over at least three RF channels, each RF module integrated in a respective RF chip of the at least three RF chips, associated with a respective RF channel of the at least three RF channels, and including (1) a frequency demultiplexer coupled to one or more antennas via a respective RF connector, and (2) at least two parallel circuits coupled to the frequency demultiplexer, each of the parallel circuits including (i) an amplifier connected to a respective output of the frequency demultiplexer and (ii) an analog bandpass filter connected in series to the amplifier;
    producing a circuit board having a breadth less than or equal to 1.65 inch; and
    assembling the at least three RF chips on the circuit board.

14. The method of claim 13, wherein the GPS receiver device has a height less than or equal to 0.95 inch.

15. The method of claim 13 further comprising:
    mounting one or more analog-to-digital converters (ADCs) to the circuit board; and
    mounting at least three RF down-conversion devices to the circuit board, each down-conversion device arranged between a respective RF chip and the one or more ADCs.

16. The method of claim 13, wherein the RF signals received over each RF channel include at least two signal components associated with at least two frequency bands, and the frequency demultiplexer is configured to separate the at least two signal components and provide each signal component for processing on a respective circuit of the at least two parallel circuits.

17. The method of claim 13, wherein the analog bandpass filters associated with the parallel circuits include surface acoustic wave (SAW) filters.

18. The method of claim 13, wherein the analog bandpass filters associated with the parallel circuits include bulk acoustic wave (BAW) filters.

19. The method of claim 13, wherein the GPS receiver device has a circular shape and a diameter less than or equal to 1.65 inch.

20. A projectile device with location tracking, comprising:
    at least three radio frequency (RF) chip including at least three RF modules configured to process RF signals received over at least three RF channels, each RF module integrated in a respective RF chip of the at least three RF chips, associated with a respective RF channel of the at least three RF channels, and including (1) a frequency demultiplexer coupled to one or more antennas via a respective RF connector, and (2) at least two parallel circuits coupled to the frequency demultiplexer, each of the parallel circuits including (i) an amplifier connected to a respective output of the frequency demultiplexer and (ii) an analog bandpass filter connected in series to the amplifier; and a circuit board on which the at least three RF chips are mounted, the circuit board having a breadth less than or equal to 1.65 inch.

* * * * *